United States Patent
Hamilton et al.

(10) Patent No.: US 9,460,460 B2
(45) Date of Patent: Oct. 4, 2016

(54) ONSITE AUTOMATED CUSTOMER ASSISTANCE

(71) Applicant: NCR Corporation, Duluth, GA (US)

(72) Inventors: Andrew R. Hamilton, Dundee (GB); Bruce Shepherd, Angus (GB); Gordon D. Patton, Fife (GB)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 14/133,128

(22) Filed: Dec. 18, 2013

(65) Prior Publication Data

US 2015/0170239 A1 Jun. 18, 2015

(51) Int. Cl.
*G06Q 30/06* (2012.01)

(52) U.S. Cl.
CPC .................. *G06Q 30/0613* (2013.01)

(58) Field of Classification Search
CPC ........... G06Q 30/0601–30/0645; G06Q 30/08
USPC ................................................ 705/26.1–27.2
See application file for complete search history.

(56) References Cited

U.S. PATENT DOCUMENTS

| | | | |
|---|---|---|---|
| 7,681,229 B1* | 3/2010 | Ebrahimi | H04L 63/0281 709/229 |
| 8,856,910 B1* | 10/2014 | Rostami-Hesarsorkh | H04L 63/1408 713/153 |
| 2004/0153368 A1* | 8/2004 | Freishtat et al. | 705/26 |
| 2009/0031410 A1* | 1/2009 | Schneider | H04L 63/0823 726/10 |
| 2011/0249081 A1* | 10/2011 | Kay et al. | 348/14.03 |
| 2012/0036452 A1* | 2/2012 | Coleman et al. | 715/751 |

OTHER PUBLICATIONS

Khosrowpour, Mehdi. Dictionary of Information Science and Technology. "Secure Socket Layer (SSL)." Hershey, PA: IGI Global, 2007. eBook Collection (EBSCOhost). Web. Feb. 8, 2016. accessed at [http://eds.a.ebscohost.com/ehost/ebookviewer/ebook/bmxlYmtfXzE3MzM5NV9fQU41?sid=3de6571f-2f70-4c28-ba43-6e7d4ab724af@sessionmgr4004&vid=0&format=EB&rid=1].*

* cited by examiner

*Primary Examiner* — Yogesh C Garg
*Assistant Examiner* — Lindsey Smith
(74) *Attorney, Agent, or Firm* — Schwegman, Lundberg & Woessner

(57) ABSTRACT

Methods and a system for automated onsite customer assistance are provided. A customer operating a Self-Service Terminal (SST) onsite of an enterprise establishes a communication session with a host system. Information passed between the SST and the host system is relayed to a device operated by a clerk that is also onsite. A real-time determination is made as to whether the customer is in need of assistance of the clerk during the communication session.

19 Claims, 4 Drawing Sheets

ONSITE AUTOMATED CUSTOMER ASSISTANCE

BACKGROUND

Increasingly, consumers are becoming comfortable with a variety of technologies as these technologies are more thoroughly integrated into the daily lives of the consumers. In fact, nearly every teenager and adult is familiar with, can operate, and possesses a smart phone these days.

Another technology area that consumers are embracing more and more is Self-Service (SS) technology. That is, enterprises have invested heavily in SS devices that permit consumers to perform a variety of transactions at a site (such as a retail store) of an enterprise. The investments have come for a variety of reasons, such as cost cutting to reduce onsite staff, reductions in expenses associated with adopting SS technology, increases in consumer throughput and experience while onsite, willingness of the consumer to embrace and use SS technology, and the like.

However, nothing frustrates a consumer more and nothing can destroy consumer loyalty more than poor enterprise service while at a site of an enterprise. In fact, the frustration is not exclusively tied to onsite service, as most consumers will attest to their displeasure with automated call centers where it can take an inordinate amount of time to speak with a real representative of an enterprise who fluently speaks the native tongue of the consumers.

So, although enterprises are integrating more and more SS options within their storefronts, the enterprises are increasing the risk that in-person service availability can substantially impair existing consumer loyalty and sales. This risk is compounded by the fact that enterprises have reduced staff because of the availability of SS options and the staff that does remain is now being asked to multitask and perform a variety of functions for more foot traffic occurring at the enterprise storefronts.

In still other situations, enterprises are setting up automated storefronts to accommodate consumers that like the impersonal nature of transacting or enjoy a perceived time and cost savings associated with using the automated storefronts.

Take for instance an automated bank branch where consumers can enter to execute financial transactions with a bank, and bank staff is made available to unobtrusively support the consumers when help is required. But, the staff cannot readily and efficiently assist the consumers unless the staff has some context as to what the consumers were doing on the Automated Teller Machines (ATMs) before help was requested. So, the consumers must explain in detail what they were doing and perhaps who they are so the staff can assist them properly. This process is also inefficient and frustrating for both the consumers and the staff of the automated bank branch.

It would also be desirable to migrate more bank customers from teller transactions to ATM transactions. However, some customers are not confident in using ATMs, so it would be advantageous to be able to provide these customers with additional help while they use the ATMs.

SUMMARY

In various embodiments, methods and a system for onsite automated customer assistance are presented.

According to an embodiment, a method for automated customer assistance is provided. Specifically, in an embodiment, information related to a communication session between a customer at a Self-Service Terminal (SST) and a host system is received. The information is monitored to determine when the customer is in need of assistance during the communication session.

DETAILED DESCRIPTION

Figure 1:
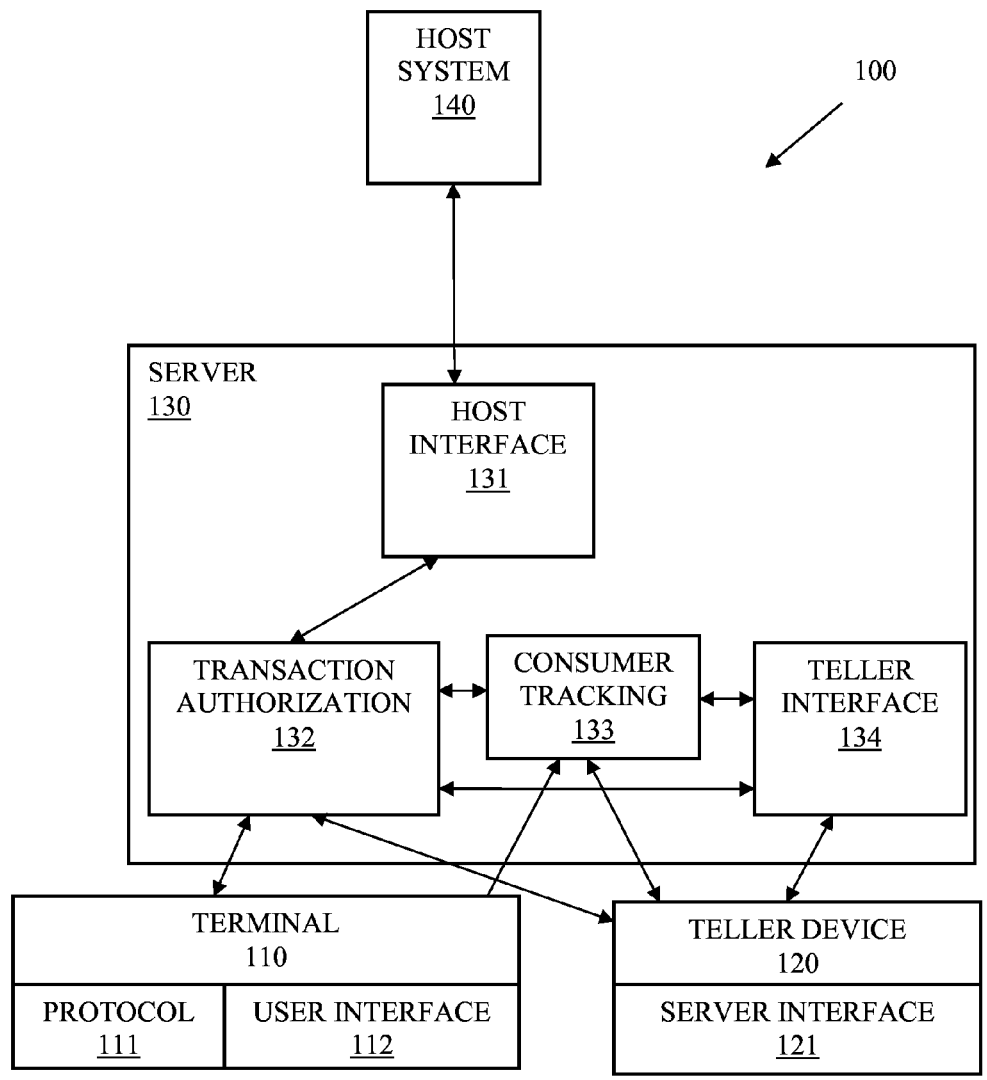
FIG. 1 is a diagram of an example architecture to enable onsite automated customer assistance, according to an example embodiment.

FIG. 1 is a diagram of an example architecture 100 for onsite automated customer assistance, according to an example embodiment. The various components are illustrated and the arrangement of the components is presented for purposes of illustration only. It is to be noted that other arrangements with more or less components are possible without departing from the onsite automated customer assistance teachings presented herein and below.

The techniques and methods presented herein and below for onsite automated customer assistance can be implemented in whole or in part in one, all, or some combination of the components shown with the architecture 100. The techniques and methods are programmed as executable instructions in memory and/or non-transitory computer-readable storage media and processed on one or more processors associated with the various components.

The example architecture 100 includes a terminal 110, a teller device 120, a server 130, and a host system 140. The server 130 also includes a host interface software module 131, a transaction authorization software module 132, a consumer tracking software module 133, and, optionally, a teller interface software module 134. The terminal 110 includes a protocol software module 111 and a user interface software module 112. Finally, the teller device 120 includes, optionally, a server interface software module 121.

The various components of the architecture 100 are now discussed within the context of an operation scenario for an automated bank branch where a consumer (can also be referred to herein as a "customer") enters the bank branch to conduct some financial transaction (which can be just a balance inquiry or request for information). The bank branch also has onsite at least one teller or clerk available to assist the consumer if needed.

It is noted that conventionally, where the terminal is an ATM, the ATM directly connects to a host system 140 without any intervening server 130. The advantageous benefits of introducing a server 130 (as reflected in the FIG. 1) between an ATM and a host system will be presented in detail herein and below. Moreover, conventionally, a customer would approach an ATM supply a bank card, enter a Personal Identification Number (PIN) and select a transaction. After these details are entered, the ATM encrypts the PIN (using an encrypting PINpad) in a manner that can only be decrypted by the host system 140 and uses a Secure Socket Layer (SSL) connection (or other secure connection) to the host system 140 to encrypt the bank card details and the selected transaction. The host system 140 relies on the SSL when authorization codes or instructions are sent directly back to the ATM. This conventional approach has been modified for the novel teachings presented herein and below.

The consumer enters the automated bank branch and begins to interact with the terminal 110. The terminal 110 in the present example is an Automated Teller Machine (ATM—a device capable of dispensing (and some ATMs, accepting) currency). It is to be noted that in other embodiments presented herein and below the terminal 110 can be any Self-Service Terminal (SST) device, such as but not limited to a kiosk or a mobile device owned by the consumer (such as a mobile phone, a laptop, a wearable device with processing capabilities and the like). For purposes of the illustration of the FIG. 1, the terminal 110 is an ATM enhanced with new and novel features as discussed below. This embodiment is particularly advantageous when used with public access terminals (such as ATMs or public kiosks) because it facilitates provision of assistance by authorized staff at the public access terminal).

The ATM 110 includes conventional software modules to permit a financial transaction with the host system 140. However, two of those software modules are enhanced with the teachings presented herein, the protocol software module 111 and the user interface software module 112. The customer enters his/her bank card, PIN, and selects a financial transaction at the ATM 110. The PIN is encrypted (by an encrypting PINpad (not shown in the FIG. 1) as is typically the case for conventional ATMs) and the bank card details (typically the account number and an indication of the customer's bank) along with the selected financial transaction are encrypted when the ATM 110 uses the protocol software module 111 to establish an SSL communication session with the server 130. The protocol software module 111 is enhanced to establish the SSL communication session with the server 130, which conventionally would not occur because the SSL communication session would conventionally be directly connected to the host system 140.

The server 130 functions as a forward proxy for the ATM 110, and the protocol software module 111 ensures that the connection between the ATM 110 occurs with the server 130, where transaction authorization software module 132 via the host interface 131 establishes another SSL connection with the host system 140 to appear to the host system 140 as if it were the ATM 110. The user interface software module 112 is enhanced to allow bi-directional communication between the existing ATM 110 and the teller device 120 via the server 130 (as discussed in greater detail below).

Once the communication session, via SSL, is established between the ATM 110 and the server 130 via the enhanced protocol software module 111, the transaction authorization software module 132 has an encrypted PIN, which it cannot decrypt, and the bank card details with the selected customer bank transaction (which can be decrypted by the transaction authorization software module 132 since it is in the same SSL communication session with the ATM 110).

Next, the transaction authorization software 132 forwards the encrypted PIN and the bank card details along with the selected bank transaction to the host interface 131. The host interface 131 acts as a transparent proxy to the host system 140, such that from the perspective of the host system 140 the requested SSL connection and the data (encrypted PIN, bank card details, and selected bank transaction) appear to be coming directly from the ATM 110 via a typical connection mode expected by the host system 140. (As noted before, the host system 140 may, when needed, act as a switch if a different host system is required to process the selected financial transaction—such as when the customer's financial account is held by a different financial institution from the automated bank branch.) So, the transaction authorization software module 132, establishes a communication session between the ATM 110 and the host system 140 via the host interface system 131, with the server 130 acting as a forward proxy to the terminal 110 and at the same time a transparent proxy to the host system 140.

As stated above, the transaction authorization software module 132 performs authorization and establishes SSL communication sessions with the server 130 to the ATM 110. This was described above. But, the transaction authorization module 132 also establishes SSL communication sessions between the server 130 and the teller device 120. The SSL communication session between the server 130 and the teller device 120 can occur in two manners: between the transaction authorization software module 132 and the server interface software module 121 of the teller device 120, or between the transaction authorization module 132 and the teller interface software module 134 of the server 130.

Once, the transaction authorization module 132 establishes the SSL communication session with the ATM 110, the user interface software module 112 pushes (from the ATM 110) the card details, selected financial transaction, and any selected amount of currency involved in the selected financial transaction (as made by the customer) to the consumer tracking software module 133 using the SSL communication session established by the transaction authorization module 132.

Next, the consumer tracking software module 133 performs a send or broadcast to provide the bank card details, the selected financial transaction, and any currency amount involved to the teller device 120. There are at least two mechanisms that could be used to implement this transmission or broadcast. Some embodiments may use one of these mechanisms; other embodiments may use the other mechanism. If the first mechanism is used, the data (bank details and selected financial transaction) are sent from the consumer tracking software module 133 to the teller interface software module 134. It should be appreciated that the data transmitted by the consumer tracking software module 133 (the "teller viewable data"), in this embodiment, is a data configured as being required by the teller, the data is received from the ATM 110 (the data required can be: "complete transaction data" (without the PIN), perhaps, a subset of the complete transaction data (without the PIN), or notifications generated by the user interface software module 112 based on the complete transaction data). As mentioned, the encrypted PIN is not transmitted from the consumer tracking software module 133 to the teller interface software module 134.

In an embodiment, the teller interface software module 134 is implemented as a set of browser pages and/or applications that are accessible via a browser. A teller operating the teller device 120 accesses a browser site (hosted by the server 130) via a link to access the teller interface software module 134. At this point, the teller can view the teller viewable data (which does not include the PIN, as discussed above) that was simultaneously sent through the host interface 131 by the transaction authorization software module 132 when establishing the SSL communication session with the host system 140. The SSL communication session between the ATM 100 and the server 130 is separate from the SSL communication session between the server 130 and the host system 140. However, the server acting as a forward proxy to the ATM 110 and separately as a transparent proxy to the host system 140 manages the two SSL communication sessions as one logical communication session from the perspective of the host system 140 and the ATM 110. This avoids having to make any software or hardware changes to the host system 140.

If the second mechanism is used, the teller viewable data are sent from the consumer tracking software module 133 directly to the teller device 120, which executes the server interface software module 121, as a mobile application. Regardless of whether the first or second mechanism is used, the teller can now view the teller viewable data on a display of the teller device 120.

Both the teller interface software module 134 and the server interface software module 121 provide for authentication of a teller and/or the teller device 120 to the server 130 via a separate SSL communication session simultaneously managed by the server 130. This communication session was discussed above and established by the transaction authorization software module 132 interacting with either the teller interface software module 134 or the server interface software module 121 of the teller device 120.

The transaction authorization software module 132 also receives authorization responses from the host interface 131 originating from the host system 140 and can communicate those authorization responses back to the ATM 110 and the consumer tracking software module 133 (which then communications the authorization responses to the teller device 120 via teller interface software module 134 or server interface software module 121). In some cases, as discussed below, the transaction authorization software module 132 may directly communication with the teller device (through the server interface software module 121 or the teller interface software module 134) when a teller is providing an override for a given customer transaction using the teller device 120.

As stated above, consumer tracking software module 133 of the server 130 can also receive information from the ATM 110 via the user interface software module 112 (information pushed from the user interface software module 112 to the consumer tracking software module 133). So, the user interface software module 112 permits a typical ATM 110 user interface software to be enhanced to provide additional options, such as a popup or option to request onsite teller assistance, when activated by the customer at the ATM 110. The SSL connection is used to transmit (push) that activation to the consumer tracking software module 133, which can then relay the activation to the teller interface software module 134 or the server interface software module 121 (depending upon which embodiment is configured for use by an administrator or by the teller if policy so permits).

In some embodiments, the transaction authorization software module 132 and the consumer tracking software module 133 can be implemented as one software module. Moreover, although a clear delineation as to what types of operations were performed by the transaction authorization software module 132 and the consumer tracking software module 133 were detailed above, it is noted that the data types being broadcast to the teller device 120 can be configured into the server 130 (which may provide a configuration software module (not shown in the FIG. 1) to facilitate such configuration by the authorized user) to come from 132 instead of 133 and vice versa.

In some embodiments, business rules are issued from the host system 140 and/or the teller device 120 (based on bank branch policies), which are implemented and enforced by the transaction authorization software module 132. For example, no more than $100 can be withdrawn from the ATM 110 because funds are low at the moment (instituted by the bank branch); check customer identity if withdraw exceeds $500 (instituted by the host system 140); and other such rules.

So, in some case, the interactions and data supplied by the customer at the ATM 110 can be broadcast by software modules 132 and 133 to the interface modules 134 and/or 121. The types of interactions and data that will be broadcast can also be defined in the configuration of the software modules 132 and 133.

The interactions and data can be viewed and analyzed by the teller using the teller device 120 via the teller interface software module 134 and/or the server interface software module 121 in real time or near-real time as the customer is in a communication session with the host system 140.

Similarly, responses sent from the host system 140, in response to details sent from the ATM 110 in response to customer input during the SSL communication session (with the server 130 acting as a proxy for both during that communication session), can be passed from the host interface 131 to the transaction authorization software module 132. The transaction authorization software module 132 then forwards the responses to the ATM 110 for the ATM 110 to act on and, simultaneously, the transaction authorization software module 132 sends the responses to the consumer tracking software module 133, which then forwards those responses to the teller interface software module 134 and/or the server interface software module 121.

So, both the data and interactions of the customer at the ATM 110 during the communication session with the host system 140 and responses sent back from the host system 140 can be viewed in real or near-real time by the teller operating the teller device 120.

The server 130 can be remotely located offsite from the automated bank branch (which has onsite the terminal 110 and the teller device 120). Alternatively, the server 130 can be located onsite at the bank branch with the terminal 110 and the teller device 120. The host system 140 is remotely located from the automated bank branch and as stated, in some cases, is typically remotely located from the server 130 as well.

The teller device 120 can be a mobile device operated by the clerk (such as a phone, a tablet, a laptop, a tablet device, a wearable processing device, and the like). In another embodiment, the teller device 120 is a standalone terminal within the automated bank branch, although this does not have the advantage of allowing the teller to carry the teller device 120 with him/her as he/she approaches the ATM 110 to assist the customer.

According to various embodiments, the interactions of the consumer (which are broadcast via the software module 133) are portrayed or presented within a Graphical User Interface (GUI) operational on the teller device 120. In one embodiment, the interactions are data being sent from the ATM 110 to the host system 140 as captured and relayed by the descriptions above during the communication session. In another embodiment, the interactions can also include other information that the user interface software interface module 112 is configured to trap and push back to the software module 133, such as a consumer request for assistance, or even a key (physical or logical) on the ATM 110 that the customer presses, or a current state of the ATM 110.

It is also to be noted that the interactions, which are broadcasts, can be broadcasts within the automated bank branch to multiple teller devices 120 that service multiple onsite tellers. This would allow any of the tellers to accept a request for help from the customer (which acceptance would be relayed to the other teller devices 120 via the server interface software module 121 so that the other tellers would know that the customer's request will be dealt with by a teller).

Interactions initiated by the host system 140 can be useful to the tellers for a variety of reasons. For example, suppose the consumer is attempting to withdraw an amount of currency from the ATM 110 that exceeds the consumer's daily allowance at an ATM; but, which would not exceed allowances if the consumer were in front of a teller (that is, at a traditional teller station) making the currency request. Policy may permit the teller to intervene and approach the consumer to validate the identity of the consumer and to provide an override code or operation to the host system 140 that then permits the currency request to be satisfied from the ATM. This can be achieved in multiple manners as well.

For example, the teller can use the interface software modules 134 and/or 121 to establish a connection to the host system 140 (similar to what was described for the communication session between the ATM 110 and the host system 140) and identify the transaction and provide an override. Alternatively, a separate interface (not depicted in the FIG. 1) that a teller might typically use on the teller device 120 may be used to connect with the host system 140 and provide an override by identifying a transaction identification included with the initial transaction as part of the data forwarded during the communication session between the ATM 110 and the host system 140. In still another case, the user interface software module 112 may permit the teller to walk over to the ATM 110 and activate some options to provide an override that is relayed to the host system 140 and permits the withdrawal. In yet another situation, the ATM 110 may have an administrative interface on the ATM 110 (not shown in the FIG. 1) that permits the override to be communicated to the host system 140. In yet another situation, the need for an override can be identified in an authorization code sent from the host 140 that is relayed from software module 132 to 133 and from 133 to the teller device via 134 or 121; the teller uses 121 or 134 to send the override to 132 and 132 provides the override code to the ATM 110.

It is noted that this is but one example and a plethora of other scenarios can be used with the teachings presented herein for onsite automated customer assistance. In the present example, however, it is apparent that the techniques and architecture 100 permit tellers that support consumers (operating ATMs 110 to transact with a host financial system 140) to intervene by monitoring transactions and provide responsive assistance to the consumers. It should be appreciated that this has the advantage of enabling the ATM 110 to execute transactions that only a teller station would have been able to execute. As a result, one reason for not using an ATM (because only a teller station can execute the desired transaction) has been removed by this embodiment, thereby facilitating migration of bank customers from teller stations to ATMs.

It is also noted that the consumer can use the ATM 110 at any time to make a request for assistance of the teller. In such a scenario, the teller is aware of what was going on with the consumer at the terminal before coming to assist (because the teller viewable data is presented to the teller, which includes details of the transaction the consumer is attempting to execute), which is also more efficient than what has been done heretofore. In still other cases, the teller via the teller device 120 may explicitly offer assistance to the consumer, in such a case a popup window may be activated at the ATM 110 (preferably to a portion of a transaction screen that is not populated with information so that the pop-up window does not obscure the options being presented to the consumer) asking the consumer if assistance of a teller is needed. All of this is achieved via the user interface module 112, the interface modules 134 and/or 121, and software modules 132 and/or 133 as described in detail above.

Figure 2:
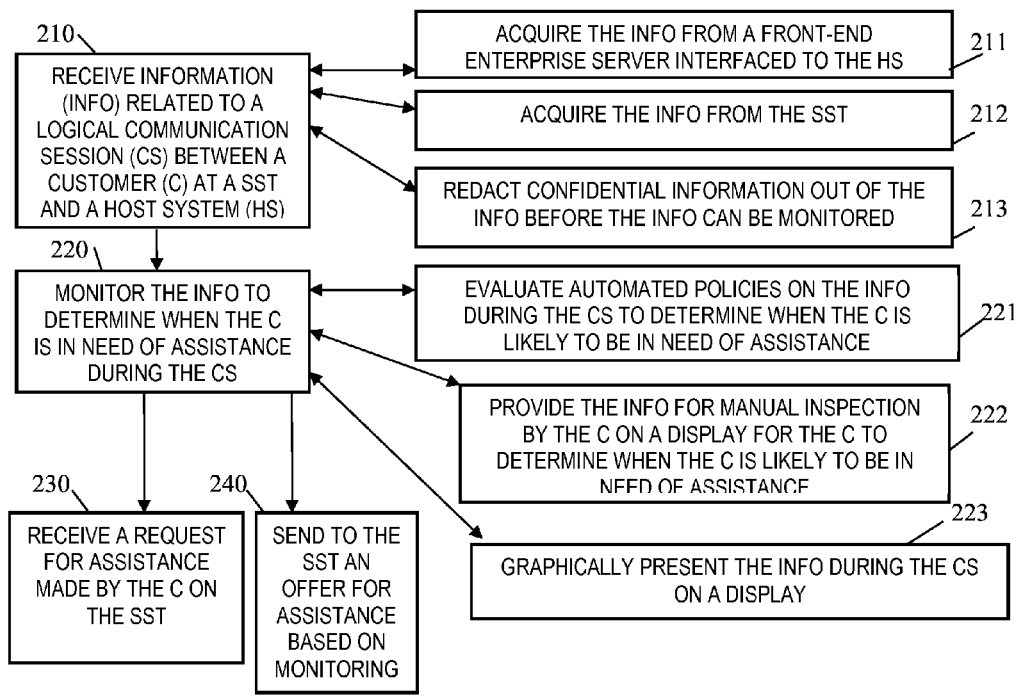
FIG. 2 is a diagram of a method for automated customer assistance, according to an example embodiment.

FIG. 2 is a diagram of a method 200 for automated customer assistance, according to an example embodiment. The software module(s) that implements the method 200 is referred to as a "clerk-assistance manager." The clerk-assistance manager is implemented as executable instructions programmed and residing within memory and/or a non-transitory computer-readable (processor-readable) storage medium and executed by one or more processors of a device. The processors of the device that executes the clerk-assistance manager are specifically configured and programmed to process the clerk-assistance manager. The clerk-assistance manager has access to one or more networks during its processing. The networks can be wired, wireless, or a combination of wired and wireless.

In an embodiment, the device that processes the clerk-assistance manager is a mobile device operated by a clerk of an enterprise, such as teller device 120 presented above with respect to architecture 100 of the FIG. 1. In another embodiment, the device that processes the clerk-assistance manager is a standalone terminal. The clerk-assistance manager, in the aforementioned embodiments, can be identified as the server interface software module 121 in the FIG. 1.

In another case, the clerk-assistance manager is identified as the teller interface software module 134. In this embodiment, the clerk-assistance manager is executed on the server 130 but viewed and interfaced on the device of the clerk; the device can be a mobile device of a standalone terminal or even a monitor connected to the server 130 as a thin client.

At 210, the clerk-assistance manager receives information related to a communication session between a customer at a SST and a host system, such as host system 140 of the FIG. 1. (An example architecture 100 for the customer establishing the communication session was presented above with reference to the FIG. 1.) The information is data that the clerk-assistance manager receives for processing, which can include displaying on a POS terminal display.

The information can include a variety of details. In some cases, all keystrokes of actions accessed by the customer during the SST and all responses from the host system are included in the information. However, PINs are not transmitted by policy as configured in the user interface software module 112 of the FIG. 1. In other cases, selective aspects of these items are included in the information. Moreover, the information may also include Meta data related to what is transpiring in the communication session, such as times actions were taken, responses were given, a time during which a consumer has been at the same SST screen, identity of the customer, loyalty level, and the like. The user interface 112 of the FIG. 1 can provide the information as well as the software modules 132 and 133 as presented above with the description of the FIG. 1.

It is also to be noted that although the host system and the enterprise were described as a bank enterprise above with reference to the FIG. 1, this does not have to always be the case. So, in some embodiments, the enterprise and host systems can be related to a variety of industries, such as a government agency, a non-profit organization, a retail store, a retail service, an event service, and others. In fact, anywhere that a customer enters a site with the intent of interacting with a backend enterprise system where staff is present can be used with the teachings presented herein.

According to an embodiment, at 211, the clerk-assistance manager acquires the information from a front-end enterprise server interfaced to the host system. That is, an intermediary between the SST of the customer and the host system is used, such as server 130 presented above with respect to the FIG. 1 (the information provided by the software modules 132 and 133 and user interface 112). The server can be locally situated onsite at the enterprise where the customer and clerk are present or can be remotely situated and geographically dispersed from the enterprise site. In some cases, the server can be dispersed over multiple locations and logically constructed as a cloud processing environment.

In another case, at 212, the clerk-assistance manager directly acquires the information from the SST. This embodiment differs from what was primarily discussed in the FIG. 1 above, in that the SST is used to directly communicate selective aspects of what it is processing during the communication session with the device that processes the clerk-assistance manager. To achieve this embodiment, further modifications to the architecture of the FIG. 1 can be made such that an agent (that is a software agent) on the teller device 120 and an agent (that is another software agent) on the ATM 110 permit this two-way direct communication. Of course, other structural arrangements are possible.

In some situations, at 213, the clerk-assistance manager redacts out (for example, by removing data to be redacted) confidential information out of the information before the clerk-assistance manager can process or present for viewing the information to the clerk. This can be driven by enterprise policy or even a customer profile or privacy agreement in an automated fashion. That is, the customer may demand greater privacy and may not want the clerk to know his/her identity, so the clerk-assistance manager can shield this from the sight of the teller based on a profile of the customer. Other situations can occur as well based on how sensitive an enterprise to a particular customer's privacy or based on governmental compliance for whatever enterprise that the clerk-assistance manager is associated with.

At 220, the clerk-assistance manager monitors the information to determine when the customer is in need of assistance during the communication session. This monitoring can be done in a variety of manners, some of which were discussed above with reference to the FIG. 1.

For example, at 221, the clerk-assistance manager can evaluate automated policies, without manual intervention from the clerk, during the communication session to determine when the customer is likely to be in need of assistance. So, specific states of the communication session can be linked via policies to suggest that the clerk intervene to provide the customer with assistance. Here, the states could be trapped and communicated via the user interface software module 112 of the FIG. 1.

In another situation, at 222, the clerk-assistance manager provides the information for manual inspection by the clerk on a display. This permits the clerk to determine when the customer is likely to be in need of assistance. Here, the clerk is making objective and subjective determinations. An objective determination might be based on a specific request for assistance made by the customer or written policies as to when the clerk should intervene with assistance as provided by the enterprise. A subjective determination might be a fact-based determination made by the clerk after inspecting the information and/or visually inspecting the customer working at the SST within the enterprise. A GUI may provide a visual indication of each SST and how long a particular SST has been in a same state. For example, a green icon may indicate that the SST has been in a state for a normal length of time, an amber icon may indicate that the SST has been in a state for slightly longer than a normal length of time, and red icon may indicate that the SST has been in a state for an abnormal length of time is typically indicative of the customer requiring assistance.

It is noted that the embodiments of 221 and 222 are not mutually exclusive, such that both can occur during the communication session between the customer and the host system.

According to an embodiment, at 223, the clerk-assistance manager graphically presents the information during the communication session on a display associated with the device that processes the clerk-assistance manager. The GUI can permit the clerk to view activity and/or status of more than one customer (via their SSTs) having a communication session with the host system and may include visual cues as to when the clerk should start paying more attention to what is occurring in a communication session with a particular customer.

In an embodiment, at 230, the clerk-assistance manager receives a request for assistance that is made directly by the customer on the SST. This was discussed above.

In still another case, at 240, the clerk-assistance manager can send an automated offer for assistance to the SST based on the monitoring. Here, a popup window may be presented on the SST asking if the customer would like to be assisted by an onsite clerk for his/her communication session with the host system.

Figure 3:
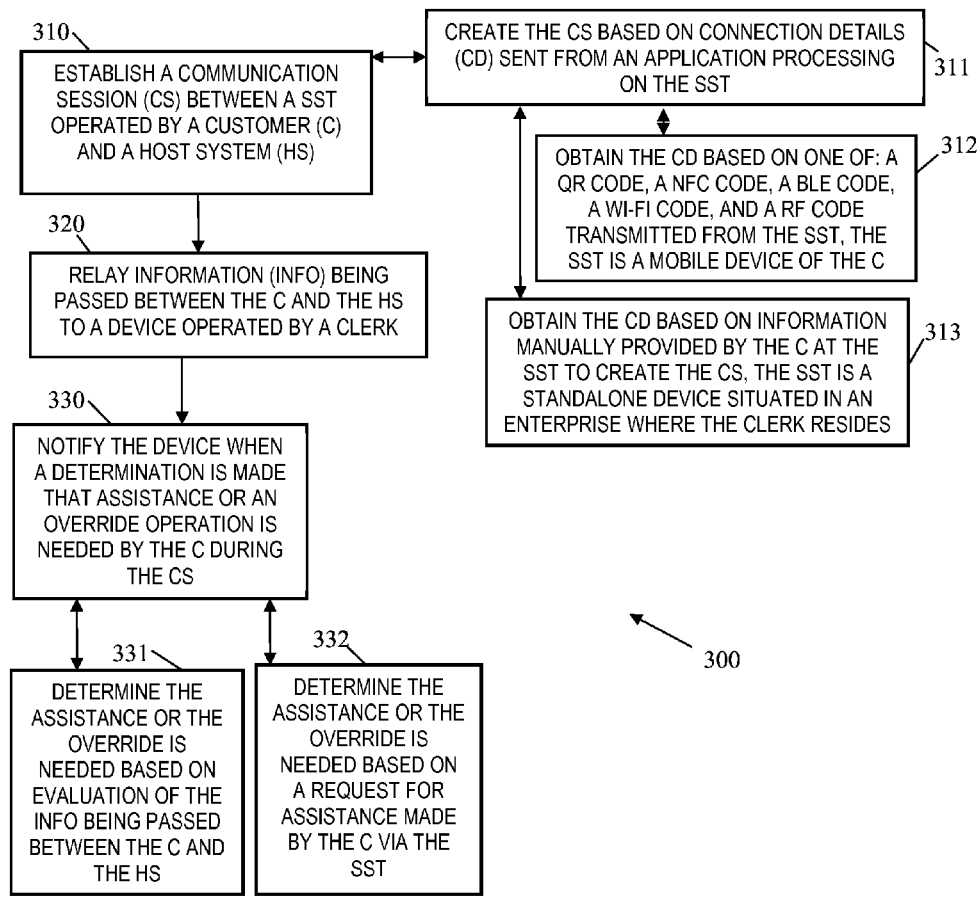
FIG. 3 is a diagram of another method for automated customer assistance, according to an example embodiment.

FIG. 3 is a diagram of another method 300 for automated customer assistance, according to an example embodiment. The software module(s) that implement the method 300 is referred to herein as a server customer-assistance manager. The server customer-assistance manager is implemented as executable instructions and programmed within memory and/or a non-transitory computer-readable (processor-readable) storage medium that executes on one or more processors of a server device, such as server 130); the processors of the server device are specifically configured to execute the server customer-assistance manager. The server customer-assistance manager can access one or more networks; the networks can be wired, wireless, or a combination of wired and wireless.

In an embodiment, the device that processes the server customer-assistance manager (method process 300) is the server 130. In an embodiment, server customer-assistance manager is implemented as the software modules 132 and 133 of the FIG. 1 and the host interface 131 of the FIG. 1.

At 310, the server customer-assistance manager establishes or facilitates a communication session between a SST operated by a customer and a host system.

According to an embodiment, at 311, the server customer-assistance manager creates the communication session based on connection details sent from an application processing on the SST. So, the communication session can be automated based on the application of the SST via the server customer-assistance manager. Moreover, it is noted that the communication session is logically one communication session from the perspective of the SST and the host system; however, as discussed above with reference to the FIG. 1, the server customer assistance manager creates two separate sessions (one between the SST and the device executing the server customer assistance manager and one between the device executing the server customer assistance manager and the host system). The server customer assistance manager maintains and manages the two separate secure sessions (SSL or other encrypted protocol connections) as one logical communication session (referred to herein and below as "the communication session.")

For example, at 312, the server customer-assistance manager obtains the connection details in an automated fashion based on one or more codes sent from the application to the server customer-assistance manager. In one embodiment, the SST may comprise a mobile device operated by the customer. These codes can include one or more of: a Quick Response (QR) code, a Near Field Communication (NFC) code, a Bluetooth Low Energy (BLE) code (or regularly Bluetooth frequency code), a Wi-Fi code, and a Radio Frequency (RF) code. The code is transmitted from the application of the SST to the server customer-assistance manager.

In another example, at 313, the server customer-assistance manager obtains the connection details based on information manually provided by the customer at the SST to create the communication session. Here, the SST is a standalone device situated in an enterprise (enterprise site—storefront) where the clerk also resides operating a POS terminal (as discussed above with reference to the FIGS. 1 and 2.

At 320, the server customer-assistance manager relays information (or broadcasts the information as discussed in the FIG. 1 above) being passed between the customer and the host system to a device operated by a clerk (POS terminal).

According to an embodiment, at 330, the server customer-assistance manager notifies the device of the clerk (POS terminal) when a determination is made that assistance or an override operation is needed by the customer during the communication session. So, in one case, an automated determination can be made via the host system, the server that processes the server customer-assistance manager, or the POS terminal of the clerk. In fact, all three devices can do their own independent automated evaluations in some embodiments.

In one instance of 330 and at 331, the server customer-assistance manager determines the assistance or the override is needed based on automated evaluation of the information being passed between the customer and the host system.

In yet another instance of 330 and at 332, the server customer-assistance manager determines the assistance or the override is needed based on a request for assistance made by the customer via the SST. This too was discussed at length above with reference to the FIGS. 1 and 2.

Figure 4:
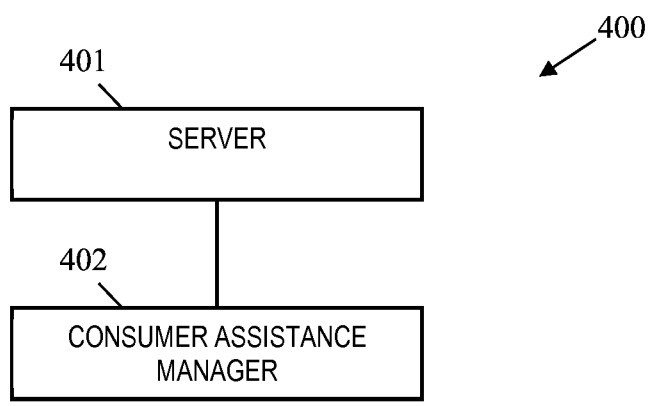
FIG. 4 is a diagram of an automated customer assistance system, according to an example embodiment.

FIG. 4 is a diagram of an automated customer assistance system 400, according to an example embodiment. The components of the automated customer assistance system 400 are programmed and reside within memory and/or a non-transitory computer-readable medium and execute on one or more processors of one or more devices. The automated customer assistance system 400 has access and can communicate over one or more networks; and the networks can be wired, wireless, or a combination of wired and wireless.

The automated customer assistance system 400 includes a server 401 having a customer assistance manager 402 (software module or set of modules).

The automated customer assistance system 400 includes a server 401 or cloud processing environment 401 having the customer assistance manager 402 programmed within memory and/or a non-transitory computer-readable storage media as executable instructions. The server 401 or cloud processing environment 402 executes the customer assistance manager 402. Example aspects associated with the customer assistance manager 402 were presented above with reference to the software module(s) that implement the methods 200 and 300 of the FIGS. 2-3 and with reference to the software modules 132 and 133, the host interface 131, and, optionally, the teller interface software module 134 included within the server 130 of the FIG. 3.

In an embodiment, the customer assistance manager 402 is the software modules that implement the methods 200 and 300 of the FIGS. 1 and 2.

In an embodiment, the customer assistance manager 402 is implemented in server 130 as the software modules 132 and 133, the host interface 131, and, optionally, the teller interface software module 134.

The customer assistance manager 402 is configured to track information being passed between a consumer operating a SST and a host system. Examples of a SST and host system were presented above with respect to the architecture 100 of the FIG. 1 and identified as 110 and 140, respectively.

The customer assistance manager 402 is also configured to relay the information to a device of a clerk. The clerk monitors the information to determine when the consumer is in need of assistance from the clerk. Moreover, as discussed above, the determination can be based on automated techniques, a specific consumer request, or manual determination made by the clerk after reviewing the information.

According to an embodiment, the SST is one of: a mobile device of the consumer (phone, tablet, laptop, wearable processing device, etc.), an ATM, and a kiosk.

In an embodiment, the device operated by the clerk from where the information is monitored is a POS terminal. In an embodiment, the POS terminal is one of: a standalone enterprise terminal and a mobile device.

In an embodiment, the customer assistance manager 402 executes on the server 401 as a forward proxy for the SST and as a transparent proxy for the host system.

It should be appreciated that where software is described in a particular form (such as a component or module) this is merely to aid understanding and is not intended to limit how software that implements those functions may be architected or structured. For example, modules 131 and 134 are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

What is claimed is:

1. A method for providing automated customer assistance, the method implements as executable instructions and reside in a non-transitory computer-readable storage medium, the instructions executed by one or more hardware processors of a hardware device, the method comprising:

processing, by the hardware device, as a transparent proxy to a host system while at the same time processing, by the hardware device, as a forward proxy to a Self-Service Terminal (SST);

receiving, by the hardware device, information related to a communication session between a customer at the SST and the host system, wherein receiving further includes creating a first Secure Socket Layer (SSL) connection between the hardware device and the SST and a second SSL connection between the hardware device and the host system for monitoring the communication session occurring between the customer operating the SST and the host system; and evaluating, by the device, automated policies in view of the information to determine when the customer is likely to be in need of assistance during the communication session for purposes of providing the customer with the automated customer assistance by linking specific states of the communication session to the automated policies and based at least in part on the information being relevant to: a denied transaction request received at the SST from the host system or a request made by the customer for assistance while operating the SST.

2. The method of claim 1 further comprising, obtaining, by the device, a request for assistance made by the customer on the SST.

3. The method of claim 1 further comprising, sending, from the device and to the SST, an offer for assistance based on monitoring.

4. The method of claim 1, wherein the receiving further includes acquiring the information from a front-end enterprise server interfaced to the host system.

5. The method of claim 1, wherein the receiving further includes acquiring the information from the SST.

6. The method of claim 1, wherein the receiving further includes redacting confidential information out of the information before the information can be monitored by the device.

7. The method of claim 1, wherein the receiving further includes evaluating automated policies on the information during the communication session to determine when the customer is likely to be in need of assistance.

8. The method of claim 1, wherein the receiving further includes providing the information for manual inspection by a clerk for the clerk to determine when the customer is likely to be in need of assistance.

9. The method of claim 1, wherein the receiving further includes graphically presenting the information during the communication session on a display of the device.

10. A method for providing automated customer assistance, the method implemented as executable instructions residing in a non-transitory computer-readable storage medium, the instructions executed by one or more hardware processors of a hardware server, the method comprising:

processing, by the hardware device, as a transparent processing to about system while at the same time processing, by the hardware device, as a forward proxy to a Self-Service Terminal (SST);

establishing, by the hardware server, a logical communication session between the SST operated by a customer and the host system by establishing a first Secure Socket Layer (SSL) connection between the server and the SST and a second SSL connection between the server and the host system; and relaying, by the server, information being passed between the customer and the host system to a device operated by a clerk for providing the customer with the automated customer assistance by exposing the information of the logical communication session between the SST and the host system to the device operated by the clerk for monitoring when customer assistance is needed.

11. The method of claim 10 further comprising, notifying, by the server, the device when a determination is made that assistance or an override operation is needed by the customer during the logical communication session.

12. The method of claim 11, wherein the notifying further includes determining the assistance or the override is needed based on a request for assistance made by the customer via the SST.

13. The method of claim 10, wherein the establishing further includes creating the logical communication session based on connection details sent from an application processing on the SST.

14. The method of claim 13, wherein the creating further includes obtaining the connection details based on one of: a Quick Response (QR) code, a Near Field Communication (NFC) code, a Bluetooth Low Energy (BLE) code, a Wi-Fi code, or a Radio Frequency code transmitted from the SST, wherein the SST is a mobile device of the customer.

15. The method of claim 13, wherein the creating further includes obtaining the connection details based on information manually provided by the customer at the SST to create the communication session, wherein the SST is a standalone device situated in an enterprise where the clerk resides.

16. A system for providing automated customer assistance, comprising:

a hardware server configured with a consumer tracking module implemented as executable instructions within a non-transitory computer-readable storage medium that is executed by one or more hardware processors of the server, the consumer tracking module configured to track information being passed between a consumer operating a Self-Service Terminal (SST) and a host system and the server is further configured to relay the information to a display associated with a clerk to allow the clerk to monitor the information to determine when the consumer is in need of assistance from the clerk for providing the automated customer assistance, wherein the server is further configured to process as a forward proxy for the SST and create a first Secure Socket Layer (SSL) connection between the forward proxy and the SST and a second SSL connection between the server and the host system for monitoring the information being passed between the customer operating the SST and the host system and exposing that information to the display associated with the clerk, and wherein the server further configured to process as a transparent proxy to the host system.

17. The system of claim 16, wherein the server further comprises a transaction authorization module that transmits transaction details to (i) a remote authorization host, and (ii) the display associated with the clerk.

18. The system of claim 17, wherein the transaction authorization module transmits the transaction details to the display via a clerk interface module executing on the server.

19. The system of claim 16, wherein the server includes a host interface operable to communicate with the host system and to receive input from a clerk device and to aggregate that input with a transaction received from the SST to permit transactions to be authorized that would otherwise be denied.

* * * * *